July 8, 1930.  F. RIES  1,770,014
AIRPLANE
Filed Aug. 11, 1928
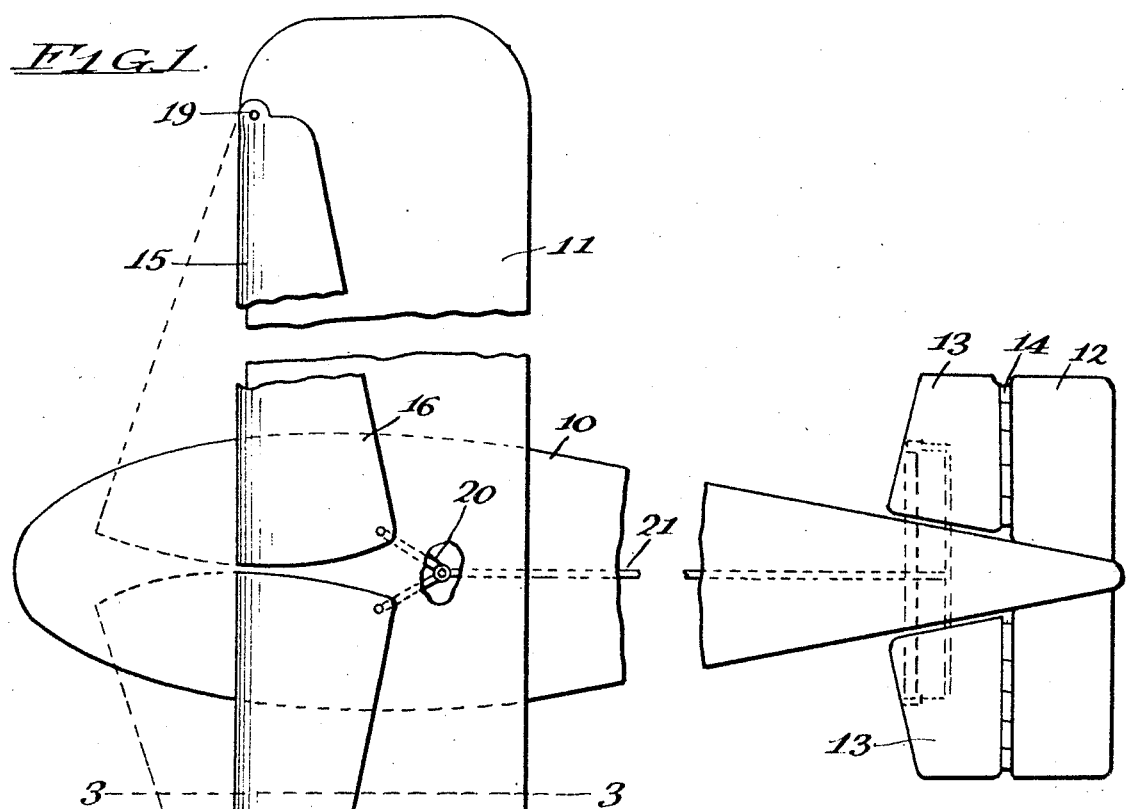
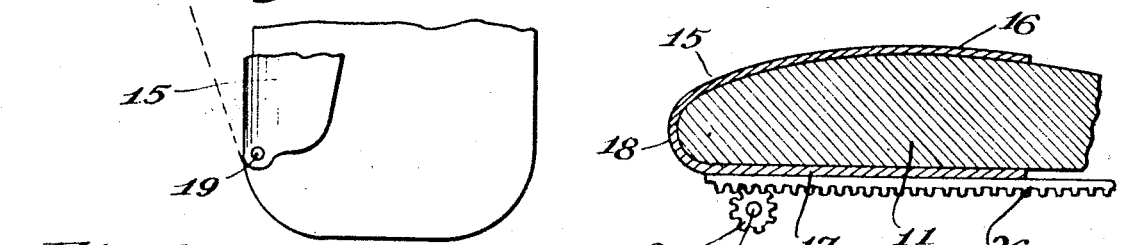
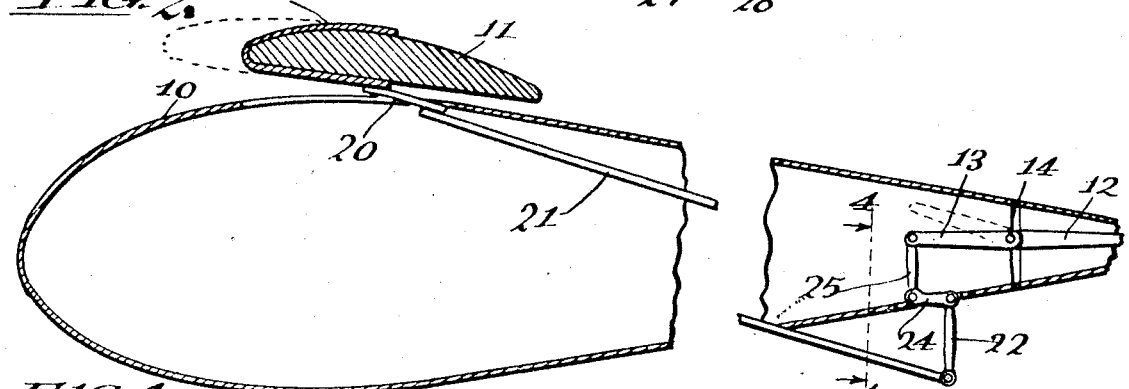
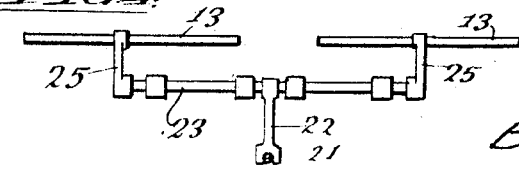
INVENTOR
FREDERICK RIES.

Patented July 8, 1930

1,770,014

UNITED STATES PATENT OFFICE

FREDERICK RIES, OF COMPTON, CALIFORNIA

AIRPLANE

Application filed August 11, 1928. Serial No. 299,048.

My invention relates to improvements in airplanes of the particular type disclosed in United States Letters Patent No. 1,560,860, issued to me October 12, 1925, and the principal object of my invention is to generally improve upon and simplify the construction of the airplane disclosed in my aforesaid patent, as well as other similar types of airplanes.

Further objects of my invention are to provide the wings of an airplane with auxiliary wing members that may be easily and quickly shifted into position of service at the will of the operator so as to materially increase the surface area of the wing and consequently increase its lifting and sustaining effect, particularly while the airplane is leaving the ground at the beginning of flight, or while alighting on the ground after flight.

A further object of my invention is to provide connections between the auxiliary wings of the airplane and the stabilizers so that the latter are shifted up or down in direct proportions to the movements of the auxiliary wings as the latter shift into and out of position of service.

With the foregoing and other objects in view, my invention consists in certain novel features of construction and arrangement of parts that will hereinafter be more fully described and claimed and illustrated in the accompanying drawing, in which:

Fig. 1 is a top plan view of an airplane that is equipped with the auxiliary wings contemplated by my invention.

Fig. 2 is a sectional view taken lengthwise through the center of an airplane and showing my improved auxiliary wings in position thereon.

Fig. 3 is a sectional view taken approximately on the line 3—3 of Fig. 1 and showing the means utilized for moving the auxiliary wings into and out of position for use.

Fig. 4 is a detail section taken approximately on the line 4—4 of Fig. 2.

Referring by numerals to the accompanying drawings which illustrate a practical embodiment of my invention, 10 designates the body or fuselage of a monoplane, 11 the wing that is mounted in the usual manner on the forward portion of the body or fuselage and arranged at the rear end of the body 10 are the usual elevators 12 and stabilizers 13, the rear edges of the latter being hinged on horizontally disposed axes 14 directly in front of the elevators 12.

The auxiliary wings 15 contemplated by my invention are preferably formed of suitable light-weight sheet metal, and said auxiliary wings extend from the center of the wing 11 outwardly to points adjacent to the outer ends of said wing and said auxiliary wings are shaped so as to fit over and beneath the front portion of the airplane wing 11. Thus each auxiliary wing comprises the upper member 16 that normally overlies the top of the front portion of wing 11 and an under portion 17 that lies beneath the front portion of wing 11. These portions 16 and 17 are connected by a curved portion 18 that conforms to the contour of the front edge of wing 11 and when the auxiliary wings are folded onto the wing 11 in out-of-service positions they fit snugly upon the front portion of wing 11, as illustrated in Figs. 1 and 2.

Each auxiliary wing is pivotally connected at its outer forward corner by means of a vertically disposed pin or bolt 19 to the front portion of wing 11, and thus the auxiliary wings are mounted so that their inner portions may swing for a considerable distance forwardly from the front edge of wing 11, such swinging movement being indicated by dotted lines in Fig. 1.

Pivotally connected to the rear inner corners of the lower portions 17 of the auxiliary wings are links 20, the rear ends of which are pivotally connected to a rod 21 that extends rearwardly through the body of the airplane and the rear end of this rod is pivotally connected to the lower end of a short crank arm 22 that depends from the central portions of a rock shaft 23.

This rock shaft is supported in suitable bearings beneath the stabilizers 13, and projecting forwardly from the ends of said rock shafts are short crank arms 24 to which are pivotally connected the lower ends of links 25 and the upper ends of the latter are pivotally connected to the front edges of the stabilizers 13 near their longitudinal centers.

Secured on the lower portion 17 of each auxiliary wing is a transversely disposed rack 26 and engaging the teeth thereof is a pinion 27 that is carried by a transversely disposed shaft 28, which latter has suitable driving connections with the motor of the airplane, or with a separate motor.

Under normal flying conditions the auxiliary wings 15 occupy positions upon the wing 11, as illustrated in Figs. 1, 2 and 3, and thus said auxiliary wings fit snugly over the front portion of the main wing and in no wise interfere with the functions thereof.

When leaving the ground or alighting thereupon it is desirable to increase the wing surface of the airplane and to also slightly elevate the front edges of the stabilizers, and under such conditions the operator of the airplane manipulates the driving connections of the shafts 28 so as to rotate the pinions 27 and move the racks 26 forwardly and correspondingly moving the auxiliary wings forward to the positions shown by dotted lines in Fig. 1, and during this movement the auxiliary wings swing upon their vertical axes 19. Inasmuch as substantial portions of the auxiliary wings move forwardly they will provide an increased wing area which will be highly effective in sustaining the plane while the same is leaving the ground or alighting thereupon.

As the auxiliary wings are moved forwardly, as just described, to provide additional wing surface, the rod 21 will be drawn forwardly, thereby rocking shaft 23 so as to swing the crank arm 24 upwardly and correspondingly elevating the forward edges of the stabilizers 13 so that the latter will function and cooperate with the auxiliary wings at the time the latter are shifted forwardly into positions of service.

In addition to providing additional sustaining surface at the beginning and termination of the flight of the airplane said auxiliary wings may be shifted forwardly into positions of service in the event that the motor of the airplane becomes inoperative during flight and the additional wing surface thus provided is of material assistance in enabling the airplane to glide to a safe landing.

Thus it will be seen that I have provided an airplane with auxiliary wings which when shifted forwardly into position for use, materially increase the effective sustaining area of the wing of the plane, thereby providing an added factor of safety for the plane and its occupants.

It will be understood that minor changes in the size, form and construction of the various parts of my improved airplane may be made and substituted for those herein shown and described without departing from the spirit of my invention, the scope of which is set forth in the appended claims.

I claim as my invention:

1. The combination with an airplane and its wing, of horizontally disposed U-shaped auxiliary wings adapted to fit over the front portion of the wing of the plane, said auxiliary wings being hinged at their outer ends to the wing of the plane near its front edge.

2. The combination with an airplane and its wing, of horizontally disposed U-shaped auxiliary wings adapted to fit over the front portion of the wing of the plane, said auxiliary wings being hinged at their outer ends to the wing of the plane near its front edge, and means for swinging said auxiliary wings forwardly relative to the wing upon which they are mounted.

3. The combination with an airplane, its main wing and stabilizers, of horizontally disposed U-shaped auxiliary wings fitted upon the front portion of the main wing of the airplane, the outer ends of said auxiliary wings being hinged to the main wing near its ends, means for moving the auxiliary wings forwardly and rearwardly relative to the main wing of the plane, and connections from said auxiliary wings to the stabilizers whereby the latter are actuated as the auxiliary wings are moved forwardly or rearwardly.

4. The combination with an airplane, its main wing and stabilizers, of horizontally disposed U-shaped auxiliary wings on the front portion of the main wing for forward and rearward swinging movement, and connections between said auxiliary wings and stabilizers whereby the latter are proportionately moved from their normal positions when the auxiliary wings are moved forwardly relative to the main wing of the plane.

5. The combination with an airplane, of horizontally disposed U-shaped auxiliary wings, each formed of a single piece of thin sheet material shaped so as to fit snugly over the front portion of the wing of the plane, which auxiliary wings are hinged to the outer ends of the main wing of the plane near its forward edge.

6. The combination with an airplane, of auxiliary wings formed of a single piece of thin sheet material shaped so as to fit snugly over the front portion of the wing of the plane, which auxiliary wings are hinged to the outer ends of the main wing of the plane near its forward edge, and means for swinging said auxiliary wings forwardly and rearwardly relative to the main wing of the plane.

In testimony whereof I affix my signature.

FREDERICK RIES.